US009367362B2

(12) United States Patent
Kern (10) Patent No.: US 9,367,362 B2
(45) Date of Patent: *Jun. 14, 2016

(54) ADMINISTRATION OF VIRTUAL MACHINE AFFINITY IN A CLOUD COMPUTING ENVIRONMENT

(75) Inventor: Eric R. Kern, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 590 days.

This patent is subject to a terminal disclaimer.

(21) Appl. No.: 12/752,762

(22) Filed: Apr. 1, 2010

(65) Prior Publication Data

US 2011/0246992 A1    Oct. 6, 2011

(51) Int. Cl.
 *G06F 9/455*        (2006.01)
 *G06F 9/46*         (2006.01)
 (Continued)

(52) U.S. Cl.
 CPC .............. *G06F 9/5088* (2013.01); *G06F 9/455* (2013.01); *G06F 9/45533* (2013.01); *G06F 9/45558* (2013.01); *G06F 9/48* (2013.01); *G06F 9/485* (2013.01); *G06F 9/4806* (2013.01); *G06F 9/4843* (2013.01); *G06F 9/4856* (2013.01); *G06F 9/4862* (2013.01); *G06F 9/4868* (2013.01); *G06F 9/4881* (2013.01); *G06F 9/50* (2013.01); *G06F 9/5005* (2013.01); *G06F 9/5011* (2013.01); *G06F 9/5027* (2013.01); *G06F 9/5033* (2013.01); *G06F 9/5055* (2013.01); *G06F 9/5061* (2013.01); *G06F 9/5072* (2013.01); *G06F 9/5077* (2013.01); *G06F 9/5083* (2013.01);

(Continued)

(58) Field of Classification Search
 USPC .............. 718/1, 100, 102, 104; 709/223, 224, 709/226
 See application file for complete search history.

(56) References Cited

U.S. PATENT DOCUMENTS

| 5,101,346 A | 3/1992 | Ohtsuki |
| 7,093,086 B1 | 8/2006 | Rietschote et al. |

(Continued)

FOREIGN PATENT DOCUMENTS

EP        2043320 A1    4/2009

OTHER PUBLICATIONS

"Method and system for dynamic detection of affinity between virtual entities".

(Continued)

*Primary Examiner* — Charles Swift
(74) *Attorney, Agent, or Firm* — Edward J. Lenart; Grant A. Johnson; Kennedy Lenart Spraggins LLP (57) ABSTRACT

Administration of virtual machine affinity in a cloud computing environment, where the cloud computing environment includes a plurality of virtual machines ('VMs'), the VMs composed of modules of automated computing machinery installed upon cloud computers disposed within a data center, the cloud computing environment also including a cloud operating system and a data center administration server operably coupled to the VMs, including installing, by the cloud operating system on at least one VM, an indicator that at least two of the VMs have an affinity requirement to be installed upon separate cloud computers; communicating, by at least one of the VMs, the affinity requirement to the data center administration server; and moving by the data center administration server the VMs having the affinity requirement to separate cloud computers in the cloud computing environment.

15 Claims, 5 Drawing Sheets

(51) Int. Cl.
*G06F 15/173* (2006.01)
*G06F 9/50* (2006.01)
*G06F 9/48* (2006.01)

(52) U.S. Cl.
CPC ............... *G06F 2009/4557* (2013.01); *G06F 2009/45562* (2013.01); *G06F 2009/45575* (2013.01); *G06F 2009/45587* (2013.01); *G06F 2009/45595* (2013.01)

(56) References Cited

U.S. PATENT DOCUMENTS

| | | | |
|---|---|---|---|
| 7,370,164 B1 | 5/2008 | Nagarkar et al. | |
| 7,502,962 B2 | 3/2009 | Yach et al. | |
| 7,802,248 B2* | 9/2010 | Broquere et al. | 718/1 |
| 7,831,600 B2 | 11/2010 | Kilian | |
| 7,890,613 B2* | 2/2011 | Tameshige et al. | 709/220 |
| 7,917,617 B1* | 3/2011 | Ponnapur et al. | 709/224 |
| 8,046,473 B2* | 10/2011 | Piper et al. | 709/227 |
| 8,060,476 B1* | 11/2011 | Afonso et al. | 707/649 |
| 2004/0221290 A1 | 11/2004 | Casey et al. | |
| 2005/0081201 A1 | 4/2005 | Aguilar et al. | |
| 2005/0198303 A1 | 9/2005 | Knauerhase et al. | |
| 2005/0262504 A1 | 11/2005 | Esfahany et al. | |
| 2006/0085792 A1 | 4/2006 | Traut | |
| 2006/0184936 A1 | 8/2006 | Abels et al. | |
| 2007/0079308 A1 | 4/2007 | Chiaramonte et al. | |
| 2007/0130566 A1* | 6/2007 | van Rietschote et al. | 718/1 |
| 2007/0208918 A1 | 9/2007 | Harbin et al. | |
| 2007/0244938 A1 | 10/2007 | Michael et al. | |
| 2008/0263544 A1 | 10/2008 | Amano et al. | |
| 2008/0295094 A1 | 11/2008 | Korupolu et al. | |
| 2009/0037585 A1 | 2/2009 | Miloushev et al. | |
| 2009/0070771 A1* | 3/2009 | Yuyitung et al. | 718/105 |
| 2009/0113109 A1 | 4/2009 | Nelson et al. | |
| 2009/0138541 A1* | 5/2009 | Wing et al. | 709/201 |
| 2009/0204826 A1 | 8/2009 | Cox et al. | |
| 2009/0249284 A1 | 10/2009 | Antosz et al. | |
| 2009/0249334 A1 | 10/2009 | Yamaguchi et al. | |
| 2009/0271472 A1 | 10/2009 | Scheifler et al. | |
| 2009/0288084 A1 | 11/2009 | Astete et al. | |
| 2009/0293056 A1 | 11/2009 | Ferris | |
| 2009/0300076 A1 | 12/2009 | Friedman et al. | |
| 2009/0300151 A1 | 12/2009 | Friedman et al. | |
| 2009/0300210 A1 | 12/2009 | Ferris | |
| 2010/0037038 A1 | 2/2010 | Bieswanger et al. | |
| 2010/0042720 A1 | 2/2010 | Stienhans et al. | |
| 2010/0106885 A1 | 4/2010 | Gao et al. | |
| 2010/0107158 A1 | 4/2010 | Chen et al. | |
| 2010/0115332 A1 | 5/2010 | Zheng et al. | |
| 2010/0131324 A1 | 5/2010 | Ferris | |
| 2010/0205304 A1 | 8/2010 | Chaturvedi et al. | |
| 2010/0211829 A1 | 8/2010 | Ziskind et al. | |
| 2010/0241896 A1 | 9/2010 | Brown et al. | |
| 2010/0293409 A1* | 11/2010 | Machida | 714/4 |
| 2010/0306379 A1 | 12/2010 | Ferris | |
| 2010/0306382 A1 | 12/2010 | Cardosa et al. | |
| 2011/0010515 A1 | 1/2011 | Ranade | |
| 2011/0022695 A1 | 1/2011 | Dalal et al. | |
| 2011/0022812 A1 | 1/2011 | Van der Linden et al. | |
| 2011/0060832 A1* | 3/2011 | Govil et al. | 709/225 |
| 2011/0072208 A1 | 3/2011 | Gulati et al. | |
| 2011/0126275 A1 | 5/2011 | Anderson et al. | |
| 2011/0179176 A1 | 7/2011 | Ravichandran et al. | |
| 2011/0208908 A1 | 8/2011 | Chou et al. | |
| 2011/0231696 A1 | 9/2011 | Ji et al. | |
| 2011/0231698 A1 | 9/2011 | Zlati et al. | |
| 2011/0238803 A1* | 9/2011 | Kern | 709/223 |
| 2011/0246627 A1* | 10/2011 | Kern | 709/220 |
| 2011/0252420 A1 | 10/2011 | Tung et al. | |
| 2011/0258481 A1 | 10/2011 | Kern | |
| 2011/0258621 A1 | 10/2011 | Kern | |
| 2012/0216196 A1 | 8/2012 | Kern | |

OTHER PUBLICATIONS

Lagar-Cavilla et al., "SnowFlock: rapid virtual machine cloning for cloud computing", 2009, in Proceedings of the 4$^{th}$ ACM European conference on Computer systems (EUroSys '09). ACM, New York, NY, USA, 1-12.
Office Action, U.S. Appl. No. 12/759,976, Aug. 28, 2012.
Office Action, U.S. Appl. No. 12/760,141, Jul. 10, 2012.
Final Office Action, U.S. Appl. No. 12/785,322, Aug. 29, 2012.
Office Action, U.S. Appl. No. 12/730,402, Dec. 1, 2011.
Notice of Allowance, U.S. Appl. No. 12/730,402, Apr. 16, 2012.
Office Action, U.S. Appl. No. 12/752,762, May 31, 2012.
Office Action, U.S. Appl. No. 12/752,322, May 16, 2012.
Final Office Action, U.S. Appl. No. 12/752,762, Oct. 29, 2012.
Office Action, U.S. Appl. No. 12/760,141, Dec. 10, 2012.
Office Action, U.S. Appl. No. 12/759,976, Mar. 20, 2013.
Chieu et al., "Dynamic Scaling of Web Applications in a Virtualized Cloud Computing Environment", IEEE International Conference on e-Business Engineering, (ICEBE '09) Oct. 2009, pp. 281-286, IEEE Xplore Digital Library (online), USA, DOI: 10.1109/ICEBE.2009.45.
Amazon, "Amazon Auto Scaling", Developer Guide, API Version, May 2009, 115 pages, Amazon Web Services (online), URL: http://awsdocs.s3.amazonaws.com/AutoScaling/latest/as-dg.pdf.
Amazon, "Auto Scaling", amazon.com (online), accessed Feb. 7, 2010, pp. 1-6, URL: http://aws.amazon.com/autoscaling/.
Costanzo et al., "Harnessing Cloud Technologies for a Virtualized Distributed Computing Infrastructure", IEEE Internet Computing, vol. 13, Issue 5, Sep. 2009, pp. 24-33, IEEE Xplore Digital Library (online), USA, DOI: 10.1109/MIC.2009.108.
IBM, "Method and System for Workload Routing in a Cloud", Technical Disclosure, IP.com prior art database (online), Nov. 2009, pp. 1-5, IP.com No. IPCOM000190107D, USA.
Jamal et al., "Virtual Machine Scalability on Multi-Core Processors Based Servers for Cloud Computing Workloads", IEEE International Conference on Networking, Architecture, and Storage (NAS 2009), Jul. 2009, pp. 90-97, IEEE Xplore Digital Library (online), USA, DOI: 10.1109/NAS.2009.20.
Kupferman et al., "Scaling Into the Cloud", Department of Computer Science, May 2011, pp. 1-8, University of California, Santa Barbara, (online), URL: http://cs.ucsb.edu/~jkupferman/docs/ScalingIntoTheClouds.pdf.
IBM, "System and apparatus for automatic health monitoring and maintenance of virtual machines", Technical Disclosure, IP.com prior art database (online), Dec. 2009, pp. 1-3, IP.com No. IPCOM000191156D, USA.
Kangarlou et al., "VNsnap: Taking Snapshots of Virtual Networked Environments With Minimal Downtime", IEEE/IFIP International Conference on Dependable Systems & Networks (DSN '09), Jun. 2009, IEEE Xplore Digital Library (online), USA, DOI: 10.1109/DSN.2009.5270298.

* cited by examiner

ADMINISTRATION OF VIRTUAL MACHINE AFFINITY IN A CLOUD COMPUTING ENVIRONMENT

BACKGROUND OF THE INVENTION

1. Field of the Invention

The field of the invention is data processing, or, more specifically, methods, apparatus, and products for administration of virtual machine affinity in a cloud computing environment.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One of the areas of technology that has seen recent advancement is cloud computing. Cloud computing is increasingly recognized as a cost effective means of delivering information technology services through a virtual platform rather than hosting and operating the resources locally. Modern clouds with hundred or thousands of blade servers enable system administrators to build highly customized virtual machines to meet a huge variety of end user requirements. Many virtual machines, however, can reside on a single powerful blade server. Cloud computing has enabled customers to build virtualized servers on hardware that they have no control over. This causes a problem when a multi-tiered application has a requirement that two or more of its virtual machines reside on different physical hardware in order to satisfy high availability requirements or other affinity-related requirements. The end user in the cloud environment creates virtual machines through a self service portal, but has no knowledge of the underlining hardware infrastructure, and no way to assure that virtual machines that need to run on separate hardware can do so.

SUMMARY OF THE INVENTION

Methods, apparatus, and computer program products for administration of virtual machine affinity in a cloud computing environment, where the cloud computing environment includes a plurality of virtual machines ('VMs'), the VMs composed of modules of automated computing machinery installed upon cloud computers disposed within a data center, the cloud computing environment also including a cloud operating system and a data center administration server operably coupled to the VMs, including installing, by the cloud operating system on at least one VM, an indicator that at least two of the VMs have an affinity requirement to be installed upon separate cloud computers; communicating, by at least one of the VMs, the affinity requirement to the data center administration server; and moving by the data center administration server the VMs having the affinity requirement to separate cloud computers in the cloud computing environment.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
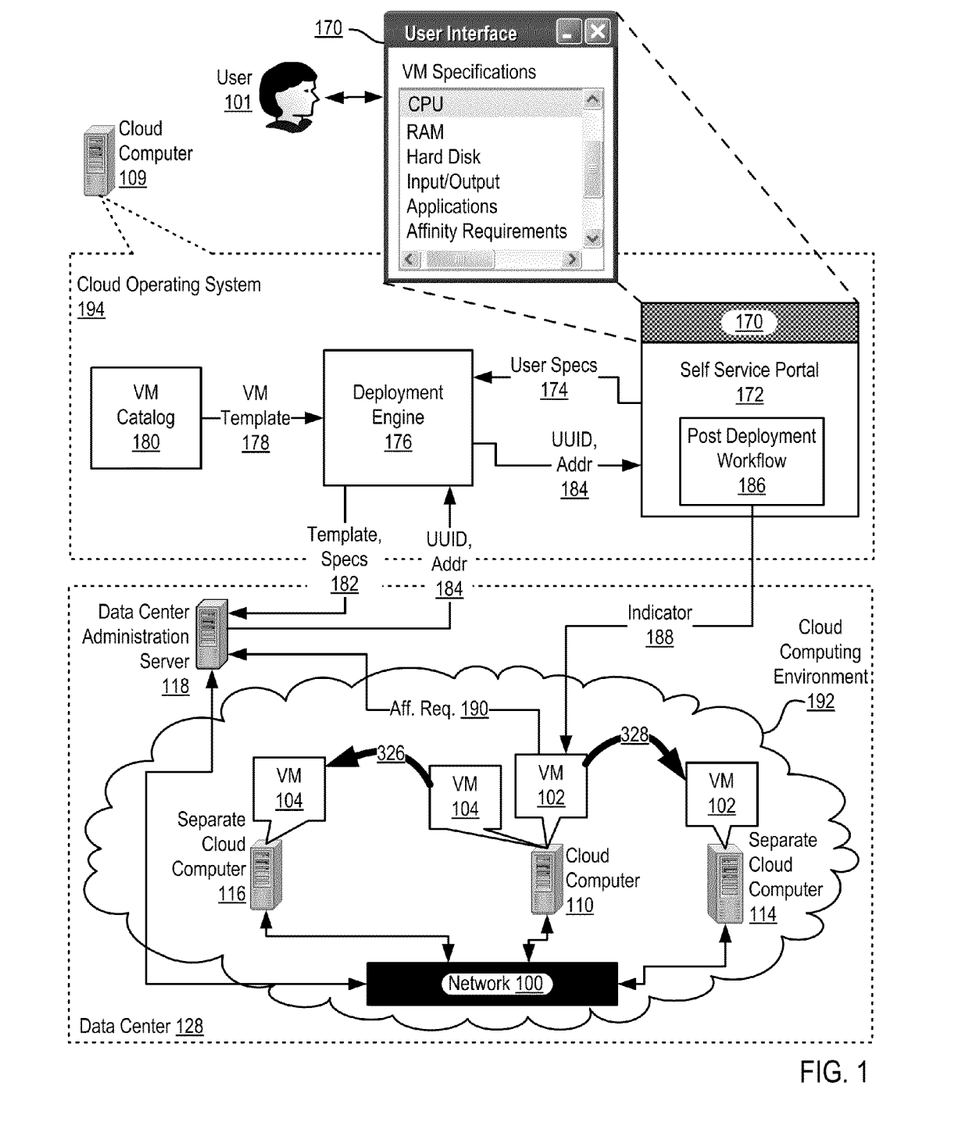
FIGS. 1 and 2 set forth functional block diagrams of apparatus that administers virtual machine affinity in a cloud computing environment according to embodiments of the present invention.

Example methods, apparatus, and products for administration of virtual machine affinity in a cloud computing environment according to embodiments of the present invention are described with reference to the accompanying drawings, beginning with FIG. 1. FIG. 1 sets forth a functional block diagram of apparatus that administers virtual machine affinity in a cloud computing environment according to embodiments of the present invention. The apparatus in the example of FIG. 1 implements a cloud computing environment (192) that includes a number of virtual machines ('VMs') (102, 104), where the VMs are modules of automated computing machinery installed upon computers (110, 114, 116) disposed within a data center (128). The cloud computing environment (192) is a network-based, distributed data processing system that provides one or more cloud computing services. Although shown here, for convenience of explanation, with only a few computers (109, 110, 114, 116) in the cloud computing environment, such a cloud computing environment typically includes, as a practical matter, many, many computers, hundreds or thousands of them, disposed within one or more data centers, with the computers typically implemented in the blade form factor. Typical examples of cloud computing services include Software as a Service ('SaaS') and Platform as a Service ('PaaS'). SaaS is a model of software deployment in which a provider licenses an application to customers for use as a service on demand. SaaS software vendors may host the application on their own clouds or download such applications from clouds to cloud clients, disabling the applications after use or after an on-demand contract expires.

PaaS is the delivery from a cloud computing environment of a computing platform and solution stack as a service. PaaS includes the provision of a software development platform designed for cloud computing at the top of a cloud stack. PaaS also includes workflow facilities for application design, application development, testing, deployment and hosting as well as application services such as team collaboration, web service integration and marshalling, database integration, security, scalability, storage, persistence, state management, application versioning, application instrumentation and developer community facilitation. These services are provisioned as an integrated solution over a network, typically the World Wide Web ('web') from a cloud computing environment. Taken together, SaaS and PaaS are sometimes referred to as 'cloudware.'

In addition to SaaS and PaaS, cloud computing services can include many other network-based services, such as, for example, utility computing, managed services, and web services. Utility computing is the practice of charging for cloud services like utilities, by units of time, work, or resources provided. A cloud utility provider can, for example, charge cloud clients for providing for a period of time certain quantities of memory, I/O support in units of bytes transferred, or CPU functions in units of CPU clock cycles utilized.

Managed services implement the transfer of all management responsibility as a strategic method for improving data processing operations of a cloud client, person or organization. The person or organization that owns or has direct oversight of the organization or system being managed is referred to as the offerer, client, or customer. The person or organization that accepts and provides the managed service from a cloud computing environment is regarded as a managed service provider or 'MSP.' Web services are software systems designed to support interoperable machine-to-machine interaction over a network of a cloud computing environment.

Web services provide interfaces described in a machine-processable format, typically the Web Services Description Language ('WSDL'). Cloud clients interact with web services of a cloud computing environment as prescribed by WSDL descriptions using Simple Object Access Protocol ('SOAP') messages, typically conveyed using the HyperText Transport Protocol ('HTTP') with an eXtensible Markup Language ('XML') serialization.

The data center (128) is a facility used for housing a large amount of electronic equipment, particularly computers and communications equipment. The data center is maintained by an organization for the purpose of handling the data necessary for its operations. A bank, for example, may have a data center, where all its customers' account information is maintained and transactions involving these accounts are carried out. Practically every company that is mid-sized or larger has some kind of data center with the larger companies often having dozens of data centers. A data center will typically include many computers, although for ease of explanation, the data center (128) in the example of FIG. 1 is shown with only a few (109, 110, 114, 116, 118). The apparatus in the example of FIG. 1 includes a data center administration server (118), a cloud computer (110), and two computers referred to as separate cloud computers (114, 116), and a data communications network (100) that couples the computers (118, 110, 114, 116, 109) in the data center (128) for purposes of data communications among them.

A 'computer' or 'cloud computer,' as the terms are used in this specification, refers generally to a multi-user computer that provides a service (e.g. database access, file transfer, remote access) or resources (e.g. file space) over a network connection. The terms 'computer' or 'cloud computer' as context requires, refer inclusively to the each computer's hardware as well as any application software, operating system software, or virtual machine installed or operating on the computer. A computer application in this context, that is, in a data center or a cloud computing environment, is often an application program that accepts connections through a computer network in order to service requests from users by sending back responses. The form factor of data center computers is often a blade; such computers are often referred to as 'blade servers.' Examples of application programs, often referred to simply as 'applications,' include file servers, database servers, backup servers, print servers, mail servers, web servers, FTP servers, application servers, VPN servers, DHCP servers, DNS servers, WINS servers, logon servers, security servers, domain controllers, backup domain controllers, proxy servers, firewalls, and so on.

The data center administration server (118) is a computer that is operably coupled to the VMs in the cloud computing environment through data communications network (100). The data center administration server (118) provides the data center-level functions of communicating with hypervisors on cloud computers to install VMs, terminate VMs, and move VMs from one cloud computer to another within the data center. In addition, the data center administration server (118) in some embodiments supports an additional module called a VM Manager that implements direct communications with VMs through modules called VM agents installed in the VMs themselves.

The example apparatus of FIG. 1 includes a cloud operating system (194) implemented as a module of automated computing machinery installed and operating on one of the cloud computers (109). The cloud operating system is in turn composed of several submodules: a virtual machine catalog (180), a deployment engine (176), and a self service portal (172). The self service portal is so-called because it enables users (101) themselves to set up VMs as they wish, although users specifying VMs through the self service portal typically have no knowledge whatsoever of the actual underlying computer hardware in the cloud computing environment—and no knowledge whatsoever regarding how their VMs are disposed upon the underlying hardware. Any particular VM can be installed on a cloud computer with many other VMs, all completely isolated from one another in operation. And all such VMs, from the perspective of any operating system or application running on a VM, can have completely different configuration of computer resources, CPUs, memory, I/O resources, and so on. Examples of cloud operating systems that can be adapted for use in administration of virtual machine affinity in a cloud computing environment according to embodiments of the present invention include VMware's Cloud OS™, the open-source eyeOS™ from eyeOS Forums, Xcerions's iCloud™, Microsoft's Windows Live Core™, Google's Chrome™, and gOS™ from Good OS.

In the example cloud operating system of FIG. 1, the self service portal (172) exposes user interface (170) for access by any user (101) that is authorized to install VMs in the cloud computing environment (192). The user may be an enterprise Information Technology ('IT') professional, an IT manager or IT administrator, setting up VMs to run applications to be used by dozens, hundreds, or thousands of enterprise employees. Or the user (101) may be an individual subscriber to cloud computing services provide through or from the cloud computing environment. The self service portal (172) receives through the user interface (170) user specifications (174) of VMs. The user specifications include for each VM specifications of computer processors, random access memory, hard disk storage, input/output resources, application programs, affinity requirements, and so on. The specifications can also include requirements for I/O response timing, memory bus speeds, Service Level Agreements ('SLAs'), Quality Of Service ('QOS') requirements, and other VM specifications as may occur to those of skill in the art.

Having received user specifications for a VM, the cloud operating system (194) then deploys the now-specified VM in accordance with the received user specifications. The self service portal (172) passes the user specification (174), except for affinity requirements, to the deployment engine. The self service portal retains any affinity requirements—thus maintaining the initial installation procedure exactly the same regardless of affinity requirements. The VM catalog (180) contains VM templates, standard-form descriptions used by hypervisors to define and install VMs. The deployment engine selects a VM template (178) that matches the user specifications. If the user specified an Intel processor, the deployment engine selects a VM template for a VM that executes applications on an Intel processor. If the user specified PCIe I/O functionality, the deployment engine selects a VM template for a VM that provides PCIe bus access. And so on. The deployment engine fills in the selected template with the user specifications and passes the complete template (182) to the data center administration server (118), which calls a hypervisor on a cloud computer to install the VM specified by the selected, completed VM template. The data center administration server (118) records a network address assigned to the new VM as well as a unique identifier for the new VM, here represented by a UUID, and returns the network address and the UUID (184) to the deployment engine. The deployment engine (176) returns the network address and the UUID (184) to the self service portal (172). The new VM is now installed as a cloud VM on a cloud computer, but neither the data center administration server (118) nor any installed VM as yet has any indication regarding any affinity requirement.

At least two VMs (102, 104) in this example, however, do have an affinity requirement, and, although VMs (102, 104) are initially installed on the same computer (110), the VMs (102, 104) have an affinity requirement to be installed on separate computers. Such an affinity requirement is specified by the user (101) through interface (170) and retained by the self service portal as part of the specification of a VM being installed in the cloud computer environment (192). An affinity requirement for VMs is an effect of a characteristic of the application programs that run in the VMs, a characteristic based on a relationship or causal connection between the application programs. Examples of such characteristics effecting affinity requirements include these relationships among application programs:

- the application programs are duplicate instances of the same program simultaneously executing same functions that need to be on separate computers to effect a Quality Of Service ('QOS') requirement or a Service Level Agreement ('SLA');
- the application programs are redundant compute nodes for failover in a high-availability cluster;
- the application programs are compute nodes in a load-balancing cluster;
- the application programs are compute nodes in a highly parallel single-instruction-multiple-data ('SIMD') cluster; and
- each application program is a component of a different level of a multi-tiered application that needs to run on a separate computer to satisfy high availability requirements.

When, as here, there is an affinity requirement, the cloud operating system installs on at least one VM an indicator (188) that at least two of the VMs (102, 104) have an affinity requirement to be installed upon separate cloud computers. The self service portal (172) having received the return of the network addresses and the UUIDs for the installed VMs, knowing that VMs (102, 104) have an affinity requirement because that information was provided by the user (101) through the interface (170), triggers a post deployment workflow (186) that installs the indicator. The indicator can take the form of a list of network addresses for the VMs having the affinity requirement, so that the VMs having the affinity requirement can exchange UUIDs and communicate them to the data center administration server (118). Or the indicator can be the UUIDs themselves. The indicator can be installed on just one of the VMs or on all the VMs having the affinity requirement. One, more than one, or all of the VMs having the indicator installed then communicates the affinity requirement (190) to the data center administration server (118), and the data center administration server moves (326, 328) the VMs (102, 104) having the affinity requirement to separate cloud computers (114, 116) in the cloud computing environment (192).

The arrangement of the server (118), the cloud computers (109, 110, 114, 116), and the network (100) making up the example apparatus illustrated in FIG. 1 are for explanation, not for limitation. Data processing systems useful for administration of virtual machine affinity in a cloud computing environment according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
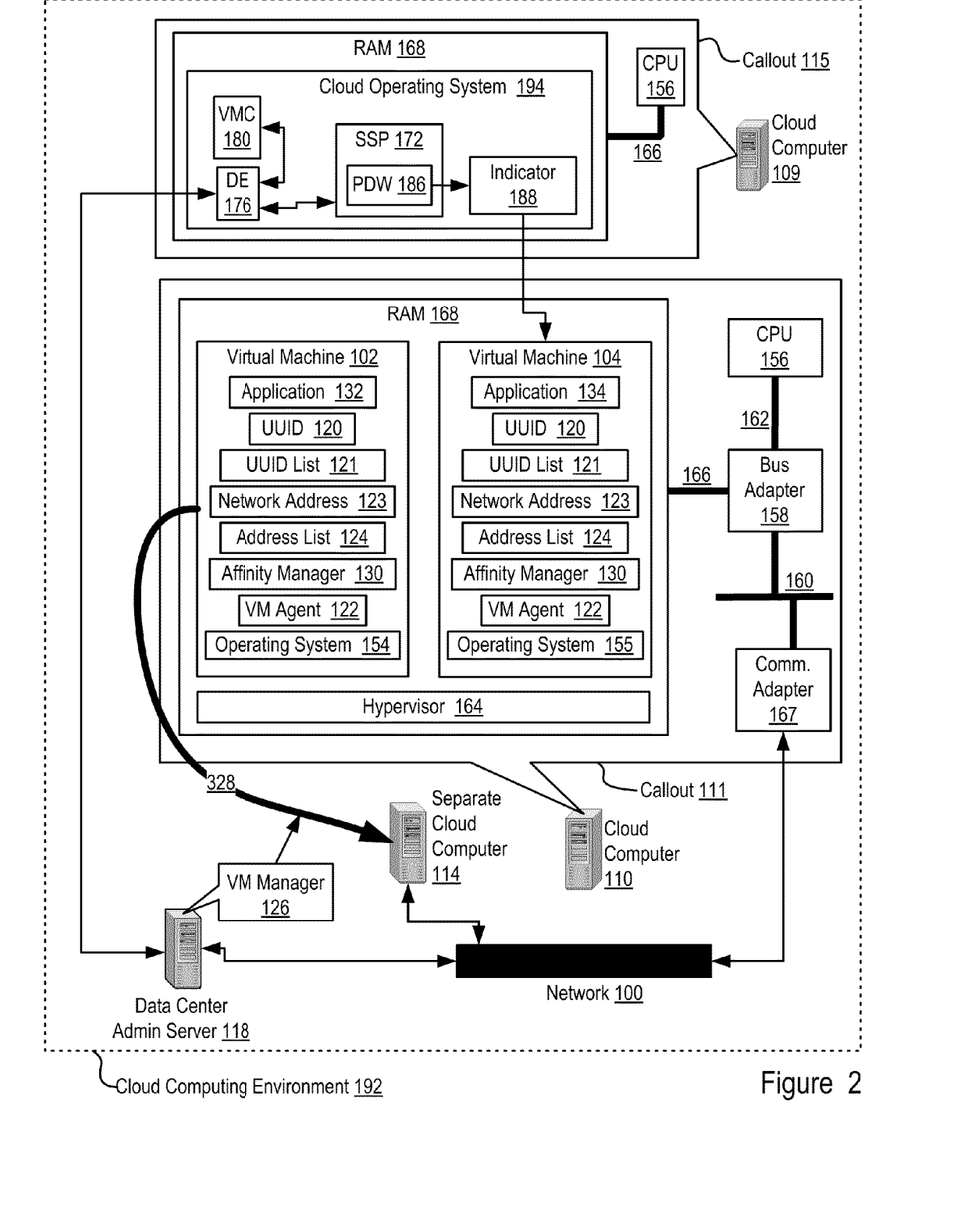

For further explanation, FIG. 2 sets forth a functional block diagram of apparatus that administers virtual machine affinity in a cloud computing environment (192) according to embodiments of the present invention. Administration of virtual machine affinity in a cloud computing environment in accordance with the present invention is implemented generally with computers, that is, with automated computing machinery. Among the example apparatus of FIG. 2, the data center administration server (118), the cloud computer (110), the separate cloud computer (114), and the network (100) are all implemented as or with automated computing machinery. For further explanation, FIG. 2 sets forth in a callout (111) a block diagram of some of the components of automated computing machinery comprised within cloud computer (110) that are used to administer virtual machine affinity in the cloud computing environment according to embodiments of the present invention. The cloud computer (110) of FIG. 2 includes at least one computer processor (156) or 'CPU' as well as random access memory ('RAM') (168) which is connected through a high speed memory bus (166) and bus adapter (158) to CPU (156) and to other components of the cloud computer (110). The example cloud computer (110) of FIG. 2 includes a communications adapter (167) for data communications with other computers through data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for administration of virtual machine affinity in a cloud computing environment according to embodiments of the present invention include modems for wired dial-up communications, Ethernet (IEEE 802.3) adapters for wired data communications network communications, and 802.11 adapters for wireless data communications network communications.

Stored in RAM (168) in the example cloud computer (110) of FIG. 2 is a hypervisor (164). The hypervisor (164) is a mechanism of platform-virtualization, a module of automated computing machinery that supports multiple operating systems running concurrently in separate virtual machines on the same host computer. The hypervisor (164) in this example is a native or bare-metal hypervisor that is installed directly upon the host computer's hardware to control the hardware and to monitor guest operating systems (154, 155) that execute in virtual machines (102, 104). Each guest operating system runs on a VM (102, 104) that represents another system level above the hypervisor (164) on cloud computer (110). Examples of hypervisors useful or that can be improved for use in administration of virtual machine affinity in a cloud computing environment according to embodiments of the present invention include IBM's z/VM™, VMware's vCenter™, INTEGRITY™ from Green Hills Software, LynxSecure™ from LynxWorks, IBM's POWER Hypervisor (PowerVM)™, Oracle's VM Server™, and Sun's Logical Domains Hypervisor™.

In the example of FIG. 2, the hypervisor (164) implements two VMs (102, 104) in the cloud computer (110). Each VM (102, 104) runs an application program (132, 134) and an operating system (154, 155). Each VM (102, 104) is a module of automated computing machinery, configured by the hypervisor, to allow the applications (132, 134) to share the underlying physical machine resources of cloud computer (110), the CPU (156), the RAM (168), the communications adapter (167) and so on. Each VM runs its own, separate operating system (154, 155), and each operating system presents system resources to the applications (132, 134) as though each application were running on a completely separate computer. That is, each VM is 'virtual' in the sense of being actually a complete computer in almost every respect. The only sense in which a VM is not a complete computer is that a VM typically makes available to an application or an operating system only a portion of the underlying hardware resources of a computer, particularly memory, CPU, and I/O resources. From the perspective of an application or an operating system running in a VM, a VM appears to be a complete computer.

Among other things, the VMs (102, 104) enable multiple operating systems, even different kinds of operating systems, to co-exist on the same underlying computer hardware, in strong isolation from one another. The association of a particular application program with a particular VM eases the tasks of application provisioning, maintenance, high availability, and disaster recovery in a data center. Because the operating systems (154, 155) are not required to be the same, it is possible to run Microsoft Windows™ in one VM and Linux™ in another VM on the same computer. Such an architecture can also run an older version of an operating system in one VM in order to support software that has not yet been ported to the latest version, while running the latest version of the same operating system in another VM on the same computer. Operating systems that are useful or that can be improved to be useful in administration of virtual machine affinity in a cloud computing environment according to embodiments of the present invention include UNIX™, Linux™, Microsoft XP™, AIX™, and IBM's i5/OS™.

In the example of FIG. 2, each VM is characterized by a Universally Unique Identifier ('UUID') (120). The VMs in the example of FIG. 2 implement a distributing computing environment, and a UUID is an identifier of a standard administered by the Open Software Foundation that enable a distributed computing environment to uniquely identify components in the environment without significant central coordination. A UUID can uniquely identify a component such as a VM with confidence that the identifier, that is, the value of a particular UUID, will never be unintentionally used to identify anything else. Information describing components labeled with UUIDs can, for example, later be combined into a single database without needing to resolve name conflicts, because each UUID value uniquely identifies the component with which it is associated. Examples of UUID implementations that can be adapted for use in administration of VM affinity in a data center according to embodiments of the present invention include Microsoft's Globally Unique Identifiers™ and Linux's ext2/ext3 file system.

The example apparatus of FIG. 2 includes a cloud operating system (194), a module of automated computing machinery installed and operating on one of the cloud computers (109). The cloud operating system (194) is in turn composed of several submodules: a virtual machine catalog ('VMC') (180), a deployment engine ('DE') (176), and a self service portal ('SSP') (172). The self service portal is so-called because it enables a user (101 on FIG. 1) to provide the user's own specification defining a VM, although a user specifying a VM through the self service portal typically has absolutely no knowledge whatsoever of the actual underlying computer hardware in the cloud computing environment—and no knowledge whatsoever regarding how the user's VM is disposed upon the underlying hardware. Any particular VM can be installed on a cloud computer with many other VMs, all completely isolated from one another in operation. And all such VMs, from the perspective of any operating system or application running on a VM, can have completely different configuration of computer resources, CPUs, memory, I/O resources, and so on.

In the example cloud operating system (194) of FIG. 2, the self service portal (172) exposes a user interface (170 on FIG. 1) for access by any user authorized to install VMs in the cloud computing environment (192). The self service portal (172) receives through its user interface user specifications of VMs. The user specifications include for each VM specifications of computer processors, random access memory, hard disk storage, input/output resources, application programs, affinity requirements, and so on. The specifications can also include requirements for I/O response timing, memory bus speeds, Service Level Agreements ('SLAs'), Quality Of Service ('QOS') requirements, and other VM specifications as may occur to those of skill in the art.

Having received user specifications for a VM, the cloud operating system (194) then deploys the now-specified VM in accordance with the received user specifications. The self service portal (172) passes the user specification, except for affinity requirements, to the deployment engine (176). The self service portal retains any affinity requirements—thus maintaining the initial installation procedure exactly the same regardless of affinity requirements. The deployment engine selects from the VM catalog (180) a VM template that matches the user specifications. The deployment engine fills in the selected template with the user specifications and passes the complete template to the data center administration server (118), which calls a hypervisor on a cloud computer to install the VM specified by the selected, completed VM template. The data center administration server (118) records a network address (123) assigned to the new VM as well as a unique identifier for the new VM, here represented by a UUID (120), and returns the network address and the UUID to the deployment engine (176). The deployment engine (176) returns the network address and the UUID to the self service portal (172). The new VM is now installed as a cloud VM on a cloud computer, but neither the data center administration server nor any installed VM as yet has any indication regarding any affinity requirement.

At least two VMs (102, 104) in this example, however, do have an affinity requirement, and, although VMs (102, 104) are initially installed on the same cloud computer (110), the VMs (102, 104) have an affinity requirement to be installed on separate computers. Such an affinity requirement is specified by a user (101 on FIG. 1) through interface (170 on FIG. 1) and retained by the self service portal (172) as part of the specification of a VM being installed in the cloud computer environment (192). An affinity requirement for VMs is an effect of a characteristic of the application programs that run in the VMs, a characteristic based on a relationship or causal connection between the application programs. Such relationships or causal connections includes, for example, applications in compute nodes for failover in a high-availability cluster, applications in compute nodes in a load-balancing cluster, identical SIMD applications in compute nodes of a massively parallel supercomputer, and so on.

When, as here, an affinity requirement does exist, the cloud operating system (194) installs on at least one VM an indicator that at least two of the VMs (102, 104) have an affinity requirement to be installed upon separate cloud computers. The self service portal (172) having received the return of the network addresses and the UUIDs for the installed VMs, and knowing that VMs (102, 104) have an affinity requirement because that information was provided by a user through the interface (170 on FIG. 1), triggers a post deployment workflow ('PDW') (186) that installs the indicator. The indicator can take the form of a list of network addresses (124) for the VMs having the affinity requirement, so that the VMs having the affinity requirement can exchange UUIDs and communicate them to the data center administration server (118). Or the indicator can be a list of identifiers for the VMs having the affinity requirement, in this case, a list (121) of UUIDs. Or the indicator can be implemented as an affinity manager (130), a module of automated computing machinery whose presence installed in a VM is itself an indication of the existence of an affinity requirement. The indicator can be installed on just one of the VMs or on all the VMs having the affinity requirement. One, more than one, or all of the VMs having the indicator installed then communicates the affinity requirement to the data center administration server (118), and the data center administration server moves the VMs (102, 104) having the affinity requirement to separate cloud computers in the cloud computing environment (192).

It is said that 'at least one,' one, more than one, or all, of the VMs communicates the affinity requirement to the data center administration server because there is more than one way that this communication can be carried out. Each of the VMs having an affinity requirement can, for example, be configured with the indicator of the affinity requirement, so that all of them can communicate the affinity requirement to the data center administration server, redundant, reliable, but more burdensome in terms of data processing requirements. In embodiments where all the VMs with an affinity requirement communicate the affinity requirement to the data center administration server, the server (118) is required to disregard duplicate notifications, but the overall protocol is relatively simple: all the VMs just do the same thing. Alternatively, only one of the VMs having an affinity requirement can be configured with the indicator, including, for example, the identities of the VMs having the affinity requirement, so that only that one VM communicates the affinity requirement to the data center administration server.

In particular in this example, the data center administration server (118) moves (328) VM (102) from cloud computer (110) to a separate cloud computer (114), leaving VM (104) on cloud computer (110), thereby effectively moving the VMs having an affinity requirement to separate computers in the cloud computing environment (912). In apparatus like that of FIG. 2, each VM can be fully characterized by contents of computer memory, including the contents of a CPUs architectural registers at any given point in time. Such a move (328) of a VM to a separate cloud computer (114) then can be carried out by the data center administration server (118) by terminating operation of a VM; moving all the contents of memory that characterize that VM at the point in time when its operations are terminated to another computer, including the contents of CPU registers that were in use at the point in time when operations are terminated; and then restarting operation of that VM on the new computer at the processing point where its operations were terminated. An example of a module that can be adapted to move a VM to a separate computer according to embodiments of the present invention is VMware's VMotion™.

The applications (132, 134), the operating systems (154, 155), the VM agents (122), and the Affinity Managers (130) in the example of FIG. 2 are illustrated for ease of explanation as disposed in RAM (168), but many components of such software typically are stored in non-volatile memory also, such as, for example, on a disk drive or in Electrically Erasable Read Only Memory or 'Flash' memory. In addition, being modules of automated computing machinery, a module such as an application (132, 134), an operating system (154, 155), a VM agent (122), or an affinity manager (130) can be implemented entirely as computer hardware, a network of sequential and non-sequential logic, as well as in various combinations of computer hardware and software, including, for example, as a Complex Programmable Logic Device ('CPLD'), an Application Specific Integrated Circuit ('ASIC'), or a Field Programmable Gate Array ('FPGA').

The arrangement of the server (118), the computers (109, 110, 114), and the network (100) making up the example apparatus illustrated in FIG. 2 are for explanation, not for limitation. Data processing systems useful for administration of virtual machine affinity in a cloud computing environment according to various embodiments of the present invention may include additional servers, routers, other devices, and peer-to-peer architectures, not shown in FIG. 2, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 2.

Figure 3:
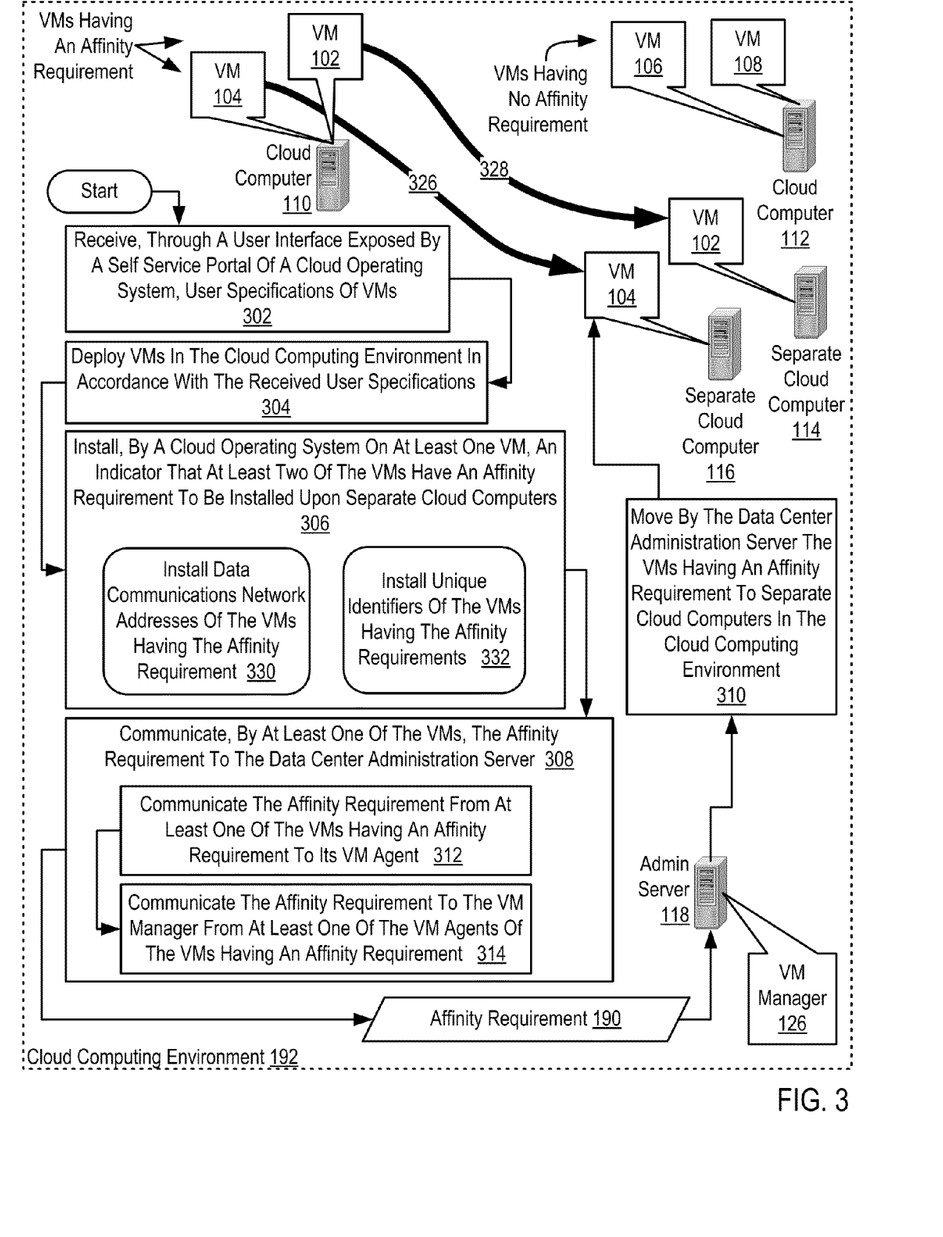
FIG. 3-5 set forth flowcharts illustrating example methods of administration of virtual machine affinity in a cloud computing environment according to embodiments of the present invention.

For further explanation, FIG. 3 sets forth a flowchart illustrating an example method of administration of virtual machine affinity in a cloud computing environment according to embodiments of the present invention. The method of FIG. 3 is implemented in a cloud computing environment (192) by and upon apparatus similar to that described above with reference to FIGS. 1 and 2, and the method of FIG. 3 is therefore described here with reference both to FIG. 3 and also to FIGS. 1 and 2, using reference numbers from all three drawings. The method of FIG. 3 is carried out in a cloud computing environment (192) that includes VMs (102, 104, 106, 108), with a data center administration server (118) operably coupled to the VMs, operably coupled as in the examples of FIGS. 1 and 2 through a data communications network (100). The cloud computing environment (192) of FIG. 3 includes a cloud operating system (194) implemented as a module of automated computing machinery installed and operating on one of the cloud computers. The cloud operating system is in turn composed of several submodules: a virtual machine catalog (180), a deployment engine (176), and a self service portal (172). Some of the VMs (102, 104) have an affinity requirement to be installed on separate computers. In the example of FIG. 3, some of the VMs (106, 108) have no affinity requirements to be installed on separate computers and in fact remain installed on the same cloud computer (112). The VMs (102, 104) that do have an affinity requirement, installed initially on the same computer (110), are moved to separate computers by methods that accord with embodiments of the present invention, as described in more detail below.

In the method of FIG. 3, operable coupling of the data center administration server to the VMs includes, not only the network (100), but also a VM manager (126) implemented as a module of automated computing machinery on the data center administration server (118) and VM agents (122 on FIG. 2) that are implemented as modules of automated computing machinery in the VMs. The VM Manager (126) is shown here for convenience of explanation as a single module of automated computing machinery installed upon the data center administration server (118), although as a practical matter, a data center can include multiple VM Managers, and VM Managers can be installed upon any data center computer or blade server having data communications connections to the VMs in the data center, including installation in a VM in a data center blade server, for example. The VM manager (126) implements administrative functions that communicate with the VM agents on the VMs to configure the VMs in the data center. The VM manager (126) and the VM agents (122) are configured to carry out data communications between the data center administration server (118) and the VMs (102, 104, 106, 108) through the network (100).

The method of FIG. 3 includes receiving (302), through a user interface (170) exposed by the self service portal (172), user specifications (174) of VMs, where the user specifications typically include specifications of computer processors, random access memory, hard disk storage, input/output resources, application programs, as well as affinity requirements. The method of FIG. 3 also includes deploying (304), by the deployment engine (176), VMs in the cloud computing environment in accordance with the received user specifications. At this stage of processing, the self service portal is aware of the affinity requirement, but neither the data center administration server nor the pertinent VMs are aware of the affinity requirement.

The method of FIG. 3 also includes installing (306), by the cloud operating system (192) on at least one VM, an indicator (188) that at least two of the VMs (102, 104) have an affinity requirement to be installed upon separate cloud computers. The indicator can take the form of a list of network addresses (124) for the VMs having the affinity requirement, so that the VMs having the affinity requirement can exchange UUIDs and communicate them to the data center administration server (118). Or the indicator can be a list (121) of identifiers for the VMs having the affinity requirement, such as a list (121) of UUIDs. Or the indicator can be implemented as an affinity manager (130), a module of automated computing machinery whose presence installed in a VM is itself an indication of the existence of an affinity requirement. The indicator can be installed on just one of the VMs, more than one VM, or on all the VMs having the affinity requirement. In this example, installing (306) an indicator (188) that at least two of the VMs have an affinity requirement includes the alternatives of installing (330) data communications network addresses (124) of the VMs having the affinity requirement and installing (332) unique identifiers (121) of the VMs having the affinity requirements.

The method of FIG. 3 also includes communicating (308), by at least one of the VMs, the affinity requirement to the data center administration server. Depending on how the indicator was deployed, one, more than one, or all of the VMs having the indicator installed can communicate the affinity requirement to the data center administration server (118). In the method of FIG. 3, communicating (308) the affinity requirement also includes communicating (312) the affinity requirement from at least one of the VMs having an affinity requirement to its VM agent. The VM agent can, for example, expose an API function for this purpose, a function such as:

affinityManagement(UUIDList), in which the function affinityManagement( ) takes a call parameter named UUIDList that is a list of the UUIDs of the VMs having an affinity requirement.

In the method of FIG. 3, communicating (308) the affinity requirement also includes communicating (314) the affinity requirement to the VM manager from at least one of the VM agents of the VMs having an affinity requirement. The VM manager can, for example, expose an API function for this purpose, a function such as:

affinityInformation (UUIDList), in which the function affinityInformation( ) takes a call parameter UUIDList that is the same list of the UUIDs of the VMs having an affinity requirement. The data center administration server (118) maintains a list or database of information describing the VMs that are installed in the data center, and such information identifies the VMs by the UUIDs and includes the network addresses for all the VMs. The affinity requirements, however, are unknown to the data center administration server until the data center administration server is advised of the affinity requirements by at least one of the VMs having an affinity requirement. In some embodiments, only one of the VMs communicates the affinity requirement to the data center administration server. In other embodiments, as many as all of the VMs having the affinity requirement communicate the affinity requirement to the data center administration server.

The method of FIG. 3 also includes the data center administration server's moving (310, 326, 328) the VMs (102, 104) having the affinity requirement to separate cloud computers (114, 116) in the cloud computing environment (192). Now that the data center administration server is advised of the existence of the affinity requirement and has the UUIDs of the VMs having the affinity requirement, the data center administration server can move the affected VMs to separate cloud computers. In the example of FIG. 2, the data center administration server moved (328) VM (102) from computer (110) to a separate computer (114), thereby effectively moving the VMs having an affinity requirement to separate cloud computers. In the example of FIG. 3, the data center administration server moves (326, 328) to separate cloud computers (114, 116) both VMs (102, 104) having an affinity requirement. Such a move (326, 328) of VMs to separate cloud computers can be carried out by terminating operation of the VMs; moving all the contents of memory that characterize those VMs at the point in time when their operations are terminated to separate cloud computers (114, 116), including the contents of CPU registers that were in use at the point in time when operations are terminated; and then restarting operation of those VMs on the separate cloud computers at the processing points where their operations were terminated.

Figure 4:
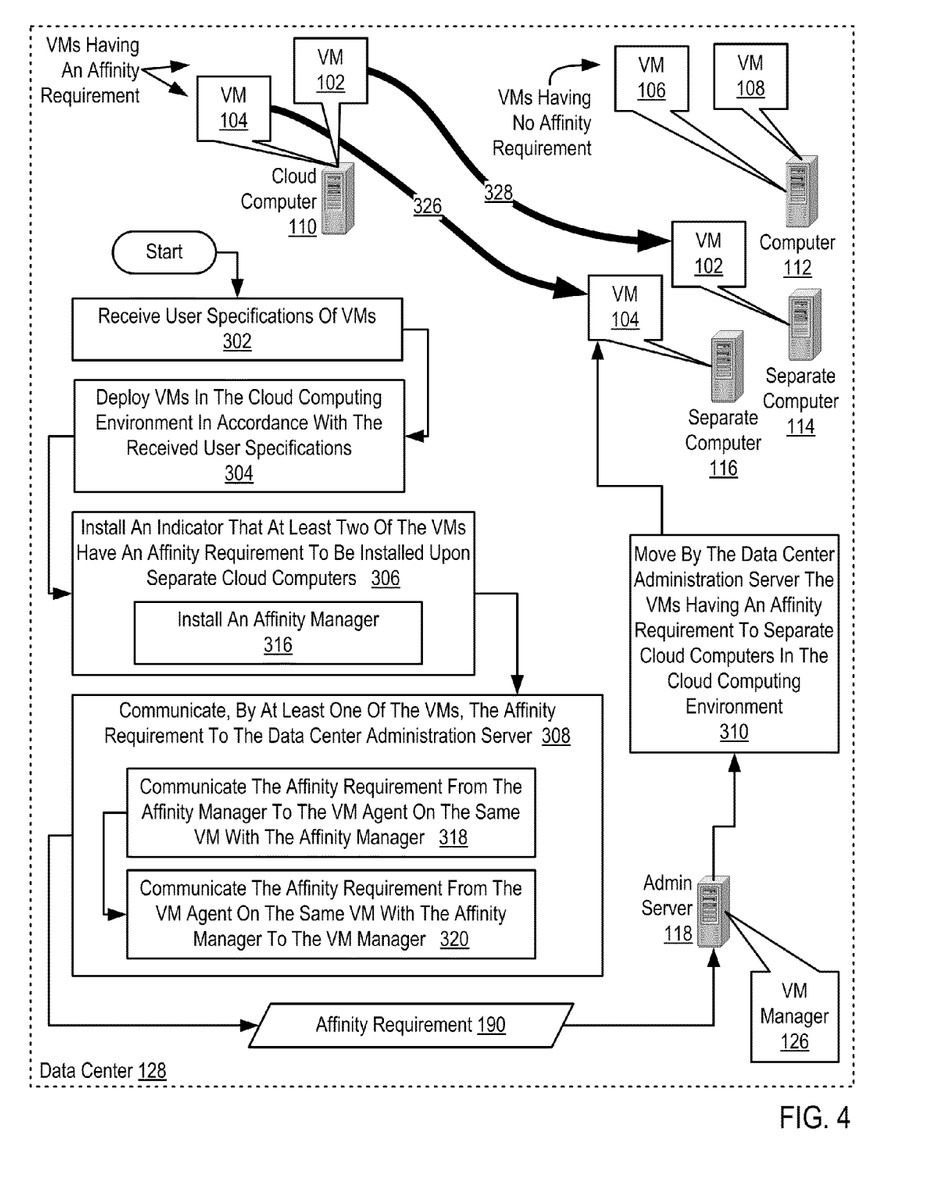

For further explanation, FIG. 4 sets forth a flowchart illustrating a further example method of administration of virtual machine affinity in a cloud computing environment according to embodiments of the present invention. The method of FIG. 4 is implemented in a cloud computing environment (192) by and upon apparatus similar to that described above with reference to FIGS. 1 and 2, and the method of FIG. 4 is therefore described here with reference both to FIG. 4 and also to FIGS. 1 and 2, using reference numbers from all three drawings. The method of FIG. 4 is carried out in a cloud computing environment (192) that includes VMs (102, 104, 106, 108), with a data center administration server (118) operably coupled to the VMs, operably coupled as in the examples of FIGS. 1 and 2 through a data communications network (100). The cloud computing environment (192) of FIG. 3 includes a cloud operating system (194) implemented as a module of automated computing machinery installed and operating on one of the cloud computers. The cloud operating system is in turn composed of several submodules: a virtual machine catalog (180), a deployment engine (176), and a self service portal (172). Some of the VMs (102, 104) have an affinity requirement to be installed on separate computers. In the example of FIG. 3, some of the VMs (106, 108) have no affinity requirements to be installed on separate computers and in fact remain installed on the same cloud computer (112). The VMs (102, 104) that do have an affinity requirement, installed initially on the same computer (110), are moved to separate computers by methods that accord with embodiments of the present invention, as described in more detail below.

In the method of FIG. 4, operable coupling of the data center administration server to the VMs includes, not only the network (100), but also a VM manager (126) implemented as a module of automated computing machinery on the data center administration server (118) and VM agents (122 on FIG. 2) that are implemented as modules of automated computing machinery in the VMs. The VM manager (126) implements administrative functions that communicate with the VM agents on the VMs to configure the VMs in the data center. The VM manager (126) and the VM agents (122) are configured to carry out data communications between the data center administration server (118) and the VMs (102, 104, 106, 108) through the network (100).

The method of FIG. 4 is similar to the method of FIG. 3, including as it does receiving (302) in a cloud operating system user specifications of VMs, deploying (304) VMs in the cloud computing environment in accordance with the received user specification, installing (306) an indicator that at least two of the VMs have an affinity requirement, communicating (308) the affinity requirement to the data center administration server (308), and moving (310) the VMs having the affinity requirement to separate cloud computers in the cloud computing environment. In the method of FIG. 4, however, installing (306) an indicator of an affinity requirement includes installing (316) an affinity manager (130). The affinity manager (130) is a module of automated computing machinery whose presence in a VM indicates the existence of an affinity requirement. In support of communicating affinity requirements, the affinity manager is typically installed with data communications network addresses for the VMs having affinity requirements or UUIDs of the VMs having affinity requirements. The affinity manager is configured to administer VM affinity in a cloud environment by communicating affinity requirement to an data center administration server or a VM manager on a data center administration server.

Also in the example of FIG. 4, communicating (308) the affinity requirement to the data center administration server includes communicating (318) the affinity requirement from the affinity manager to the VM agent on the same VM with the affinity manager. The VM agent can, for example, expose an API function for this purpose, a function such as:
 affinityManagement(UUIDList),
in which the function affinityManagement( ), when called by an affinity manager, takes a call parameter named UUIDList that is a list of the UUIDs of the VMs having an affinity requirement.

In the example of FIG. 4, communicating (308) the affinity requirement to the data center administration server also includes communicating (320) the affinity requirement from the VM agent on the same VM with the affinity manager to the VM manager. The VM manager can, for examples, expose an API function for this purpose, a function such as:
 affinityInformation (UUIDList),
in which the function affinityInformation( ), when called by a VM agent, takes a call parameter UUIDList that is the same list of the UUIDs of the VMs having an affinity requirement. The data center administration server (118), or the VM manager (126) on the data center administration server, maintains a list or database of information describing the VMs that are installed in the data center, and such information identifies the VMs by the UUIDs and includes the network addresses for all the VMs. Any affinity requirements, however, are unknown to the data center administration server and the VM Manager until the data center administration server or the VM manager is advised of the affinity requirements by at least one of the VMs having an affinity requirement.

Figure 5:
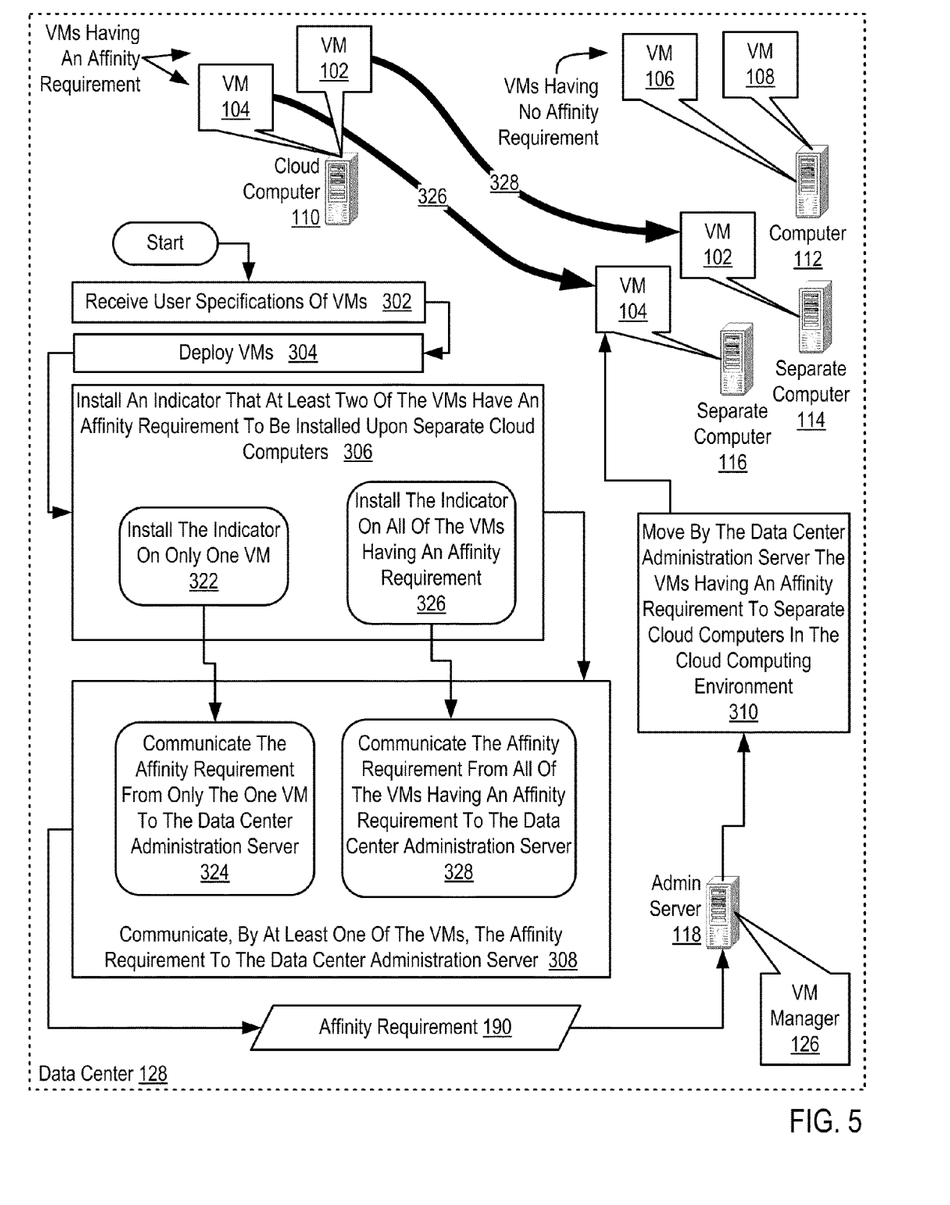

For further explanation, FIG. 5 sets forth a flowchart illustrating a further example method of administration of virtual machine affinity in a cloud computing environment according to embodiments of the present invention. The method of FIG. 5 is implemented in a cloud computing environment (192) by and upon apparatus similar to that described above with reference to FIGS. 1 and 2, and the method of FIG. 5 is therefore described here with reference both to FIG. 5 and also to FIGS. 1 and 2, using reference numbers from all three drawings. The method of FIG. 4 is carried out in a cloud computing environment (192) that includes VMs (102, 104, 106, 108), with a data center administration server (118) operably coupled to the VMs, operably coupled as in the examples of FIGS. 1 and 2 through a data communications network (100). The cloud computing environment (192) of FIG. 3 includes a cloud operating system (194) implemented as a module of automated computing machinery installed and operating on one of the cloud computers. The cloud operating system is in turn composed of several submodules: a virtual machine catalog (180), a deployment engine (176), and a self service portal (172). Some of the VMs (102, 104) have an affinity requirement to be installed on separate computers. In the example of FIG. 3, some of the VMs (106, 108) have no affinity requirements to be installed on separate computers and in fact remain installed on the same cloud computer (112). The VMs (102, 104) that do have an affinity requirement, installed initially on the same computer (110), are moved to separate computers by methods that accord with embodiments of the present invention, as described in more detail below.

In the method of FIG. 5, operable coupling of the data center administration server to the VMs includes, not only the network (100), but also a VM manager (126) implemented as a module of automated computing machinery on the data center administration server (118) and VM agents (122 on FIG. 2) that are implemented as modules of automated computing machinery in the VMs. The VM manager (126) implements administrative functions that communicate with the VM agents on the VMs to configure the VMs in the data center. The VM manager (126) and the VM agents (122) are configured to carry out data communications between the data center administration server (118) and the VMs (102, 104, 106, 108) through the network (100).

The method of FIG. 5 is similar to the method of FIG. 3, including as it does receiving (302) in a cloud operating system user specifications of VMs, deploying (304) VMs in the cloud computing environment in accordance with the received user specification, installing (306) an indicator that at least two of the VMs have an affinity requirement, communicating (308) the affinity requirement to the data center administration server (308), and moving (310) the VMs having the affinity requirement to separate cloud computers in the cloud computing environment. The indicator (188 on FIG. 1) can take the form of a list of network addresses (124 on FIG. 2) for the VMs having the affinity requirement, so that the VMs having the affinity requirement can exchange UUIDs and communicate them to the data center administration server (118). Or the indicator can be a list (121 on FIG. 2) of identifiers for the VMs having the affinity requirement, such as a list (121) of UUIDs. Or the indicator can be implemented as an affinity manager (130 on FIG. 2), a module of automated computing machinery whose presence installed in a VM is itself an indication of the existence of an affinity requirement.

The method of FIG. 5, however, includes two alternative ways of installing (306) an indicator of an affinity requirement and communicating (326) the affinity requirement to a data center administration server. In one alternative, installing (306) an indicator of an affinity requirement includes installing (322) the indicator on only one VM, and communicating (326) the affinity requirement to a data center administration server includes communicating (324) communicating the affinity requirement from only the one VM to the data center administration server. In the other alternative, installing (306) an indicator of an affinity requirement includes installing (326) the indicator on all of the VMs having an affinity requirement, and communicating (326) the affinity requirement to a data center administration server includes communicating (328) the affinity requirement from all of the VMs having an affinity requirement to the data center administration server.

Example embodiments of the present invention are described largely in the context of a fully functional computer system for administration of virtual machine affinity in a cloud computing environment. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, that is as apparatus, or as a method or a computer program product. Accordingly, aspects of the present invention may take the form of an entirely hardware embodiment, embodiments that are at least partly software (including firmware, resident software, micro-code, etc.), with embodiments combining software and hardware aspects that may generally be referred to herein as a "circuit," "module," "apparatus," or "system." Furthermore, aspects of the present invention may take the form of a computer program product embodied in one or more computer readable media having computer readable program code embodied thereon.

Any combination of one or more computer readable media may be utilized. A computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in a flowchart or block diagram may represent a module, segment, or portion of code or other automated computing machinery, which comprises one or more executable instructions or logic blocks for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of administration of virtual machine affinity in a cloud computing environment, the cloud computing environment comprising a plurality of virtual machines ('VMs'), the VMs comprising modules of automated computing machinery installed upon cloud computers disposed within a data center, the cloud computing environment further comprising a cloud operating system and a data center administration server operably coupled to the VMs, the data center administration server operably coupled to the VMs further comprises the data center administration of automated computing machinery on the data center administration server and VM agents that are implemented as modules of automated computing machinery in the VMs, the VM manager on the data center administration server comprising administrative functions that communicate with the VM agents on the VMs to configure the VMs in the data center; the method comprising:

installing, by the cloud operating system on at least one VM, an indicator that at least two of the VMs have an affinity requirement to be installed upon separate cloud computers, wherein installing an indicator further comprises installing data communications network addresses of the VMs having the affinity requirement, wherein installing an indicator further comprises installing an affinity manager, the affinity manager comprising a further module of automated computing machinery;

exchanging unique identifiers by the VMs having the affinity requirement using the data communications network addresses;

communicating, by at least one of the VMs, the affinity requirement to the data center administration server, wherein communicating the affinity requirement further comprises:

communicating the affinity reauirement from the affinity manager to the VM agent on the same VM with the affinity manager;

and communicating the affinity requirement from the VM agent on the same VM with the affinity manager; and moving by the data center administration server the VMs having the affinity requirement to separate cloud computers in the aloud computing environment.

2. The method of claim 1 wherein the cloud operating system comprises a module of automated computing machinery, further comprising a self service portal and a deployment engine, the method further comprising:

receiving, through a user interface exposed by the self service portal, user specifications of VMs, the user specifications including specifications of computer processors, random access memory, hard disk storage, input/output resources, application programs, and affinity requirements; and deploying, by the deployment engine, VMs in the cloud computing environment in accordance with the received user specifications.

3. The method of claim 1 wherein installing an indicator further comprises installing unique identifiers of the VMs having the affinity requirements.

4. The method of claim 1 wherein:

the data center administration server operably coupled to the VMs further comprises the data center administration server operably coupled to the VMs through a VM manager implemented as a module of automated computing machinery on the data center administration server and VM agents that are implemented as modules of automated computing machinery in the VMs, the VM manager on the data center administration server comprising administrative functions that communicate with the VM agents on the VMs to configure the VMs in the data center; and communicating the affinity requirement further comprises:

communicating the affinity requirement from at least one of the VMs having an affinity requirement to its VM agent; and communicating the affinity requirement to the VM manager from at least one of the VM agents of the VMs having an affinity requirement.

5. The method of claim 1 wherein:

installing the indicator further comprises installing the indicator on only one VM; and communicating the affinity requirement further comprises communicating the affinity requirement from only the one VM to the data center administration server.

6. The method of claim 1 wherein:
installing the indicator further comprises installing the indicator on all of the VMs having an affinity requirement; and
communicating the affinity requirement further comprises communicating the affinity requirement from all of the VMs having an affinity requirement to the data center administration server.

7. Apparatus for administration of virtual machine affinity in a cloud computing environment, the apparatus comprising:
a plurality of virtual machines ('VMs'), the VMs comprising modules of automated computing machinery installed upon cloud computers disposed within a data center;
a cloud operating system;
a data center administration server operably coupled to the VMs, the data center administration server operably coupled to the VMs further comprises the data center administration server operably coupled to the VMs through a VM manager implemented as a module of automated computing machinery on the data center administration server and VM agents that are implemented as modules of automated computing comprising administrative functions that communicate with the VM agents on the VMs to configure the VMs in the data center;
at least one computer processor; and
a computer memory operatively coupled to the computer processor, the computer memory having disposed within it computer program instructions which when executed cause the apparatus to function by:
installing, by the cloud operating system on at least one VM, an indicator that at least two of the VMs have an affinity requirement to be installed upon separate cloud computers, wherein installing an indicator further comprises installing data communications network addresses of the VMs having the affinity requirement, wherein installing an indicator further comprises installing an affinity manager, the affinity manager comprising a further module of automated computing machinery;
exchanging unique identifiers by the VMs having the affinity requirement using the data communications network addresses;
communicating, by at least one of the VMs, the affinity requirement to the data center administration server, wherein communicating the affinity requirement further comprises:
communicating the affinity requirement from the affinity manager to the VM agent on the same VM with the affinity manager;
and communicating the affinity requirement from the VM agent on the same VM with the affinity manager to the VM manager; and
moving by the data center administration server the VMs having the affinity requirement to separate cloud computers in the cloud computing environment.

8. The apparatus of claim 7 wherein the cloud operating system comprises a module of automated computing machinery, further comprising a self service portal and a deployment engine, the computer program instructions further causing the apparatus to function by:
receiving, through a user interface exposed by the self service portal, user specifications of VMs, the user specifications including specifications of computer processors, random access memory, hard disk storage, input/output resources, application programs, and affinity requirements; and
deploying, by the deployment engine, VMs in the cloud computing environment in accordance with the received user specifications.

9. The apparatus of claim 7 wherein installing an indicator further comprises installing unique identifiers of the VMs having the affinity requirements.

10. The apparatus of claim 7 wherein:
the data center administration server operably coupled to the VMs further comprises the data center administration server operably coupled to the VMs through a VM manager implemented as a module of automated computing machinery on the data center administration server and VM agents that are implemented as modules of automated computing machinery in the VMs, the VM manager on the data center administration server comprising administrative functions that communicate with the VM agents on the VMs to configure the VMs in the data center; and
communicating the affinity requirement further comprises:
communicating the affinity requirement from at least one of the VMs having an affinity requirement to its VM agent; and
communicating the affinity requirement to the VM manager from at least one of the VM agents of the VMs having an affinity requirement.

11. The apparatus of claim 7 wherein:
installing the indicator further comprises installing the indicator on only one VM; and
communicating the affinity requirement further comprises communicating the affinity requirement from only the one VM to the data center administration server.

12. The apparatus of claim 7 wherein:
installing the indicator further comprises installing the indicator on all of the VMs having an affinity requirement; and
communicating the affinity requirement further comprises communicating the affinity requirement from all of the VMs having an affinity requirement to the data center administration server.

13. A computer program product for administration of virtual machine affinity in a cloud computing environment, the cloud computing environment comprising a plurality of virtual machines ('VMs'), the VMs comprising modules of automated computing machinery installed upon aloud computers disposed within a data center, a cloud operating system, a data center administration server operably coupled to the VMs, the data center administration server operably coupled to the VMs further comprises the data center administration server operably coupled to the VMs through a VM manager implemented as a module of automated computing machinery on the data center administration server and VM agents that are implemented as modules of automated computing machinery in the VMs, the VM manager on the data center administration server comprising administrative functions that communicate with the VM agents on the VMs to configure the VMs in the data center; the computer program product disposed upon a non-transitory computer readable storage medium, the computer program product comprising computer program instructions which when executed cause the VMs and computers in the cloud computing environment to function by:
installing, by the cloud operating system on at least one VM, an indicator that at least two of the VMs have an affinity requirement to be installed upon separate cloud computers, wherein installing an indicator further comprises installing data communications network addresses of the VMs having the affinity requirement, wherein installing an indicator further comprises installing an affinity manager, the affinity manager comprising a further module of automated computing machinery;

exchanging unique identifiers by the VMs having the affinity requirement using the data communications network addresses;

communicating, by at least one of the VMs, the affinity requirement to the data center administration server, wherein communicating the affinity requirement further comprises:

communicating the affinity requirement from the affinity manager to the VM agent on the same VM with the affinity manager;

and communicating the affinity requirement from the VM agent on the same VM with the affinity manager to the VM manager; and moving by the data center administration server the VMs having the affinity requirement to separate cloud computers in the cloud computing environment.

14. The computer program product of claim 13 wherein the cloud operating system comprises a module of automated computing machinery, further comprising a self service portal and a deployment engine, the computer program instructions further causing the VMs and computers in the cloud computing environment to function by:

receiving, through a user interface exposed by the self service portal, user specifications of VMs, the user specifications including specifications of computer processors, random access memory, hard disk storage, input/output resources, application programs, and affinity requirements; and deploying, by the deployment engine, VMs in the cloud computing environment in accordance with the received user specifications.

15. The computer program product of claim 13 wherein:

the data center administration server operably coupled to the VMs further comprises the data center administration server operably coupled to the VMs through a VM manager implemented as a module of automated computing machinery on the data center administration server and VM agents that are implemented as modules of automated computing machinery in the VMs, the VM manager on the data center administration server comprising administrative functions that communicate with the VM agents on the VMs to configure the VMs in the data center; and communicating the affinity requirement further comprises:

communicating the affinity requirement from at least one of the VMs having an affinity requirement to its VM agent; and communicating the affinity requirement to the VM manager from at least one of the VM agents of the VMs having an affinity requirement.

\* \* \* \* \*